United States Patent
Couch

(10) Patent No.: US 8,832,903 B1
(45) Date of Patent: Sep. 16, 2014

(54) RUG ACCESSORIES

(71) Applicant: Steve Couch, Chattanooga, TN (US)

(72) Inventor: Steve Couch, Chattanooga, TN (US)

(*) Notice: Subject to any disclaimer, the term of this patent is extended or adjusted under 35 U.S.C. 154(b) by 0 days.

(21) Appl. No.: 13/779,942

(22) Filed: Feb. 28, 2013

Related U.S. Application Data

(60) Provisional application No. 61/611,248, filed on Mar. 15, 2012.

(51) Int. Cl.
*A47G 27/04* (2006.01)
*A47G 27/02* (2006.01)
*B32B 3/10* (2006.01)

(52) U.S. Cl.
CPC ........ *A47G 27/0268* (2013.01); *A47G 27/0418* (2013.01); *B32B 3/10* (2013.01)
USPC .............................................................. 16/4

(58) Field of Classification Search
CPC . A47G 27/04; A47G 27/045; A47G 27/0493; A47G 27/0412; A47G 27/0418; A47G 27/0431; B60N 3/046; B60R 13/0206
USPC ............... 16/4, 6, 8, 17.1; 428/53, 61, 62, 99, 428/100, 223; 112/410, 417
See application file for complete search history.

(56) References Cited

U.S. PATENT DOCUMENTS

| | | | | |
|---|---|---|---|---|
| 926,125 | A * | 6/1909 | Lane ................................ | 428/33 |
| 1,430,981 | A * | 10/1922 | Goldthwaite .................. | 16/17.1 |
| 1,598,127 | A * | 8/1926 | Fleming ......................... | 16/17.1 |
| 1,826,988 | A * | 10/1931 | Campbell, Jr. ...................... | 16/4 |
| 5,415,915 | A * | 5/1995 | Oh .................................... | 428/99 |
| 5,424,107 | A * | 6/1995 | Lee .................................. | 428/80 |
| 5,512,347 | A * | 4/1996 | Chu ................................ | 428/81 |
| 5,666,691 | A * | 9/1997 | Bealing et al. ....................... | 16/4 |
| 6,124,017 | A * | 9/2000 | Sokol et al. ..................... | 428/99 |
| 6,777,060 | B2 * | 8/2004 | Sehmer et al. .................. | 428/95 |
| 7,945,992 | B2 * | 5/2011 | Parisi et al. ......................... | 16/4 |
| 2012/0052235 | A1 * | 3/2012 | Clohessy et al. ................ | 428/99 |
| 2012/0073081 | A1 * | 3/2012 | Crenshaw, Sr. ................ | 16/17.1 |

* cited by examiner

*Primary Examiner* — Chuck Mah
(74) *Attorney, Agent, or Firm* — Stephen J. Stark; Miller & Martin PLLC

(57) ABSTRACT

A rug accessory provides an adornment for rugs and carpet. At least one downwardly directed receiver at least assists in connecting the accessory to a rug or the like. A connector may assist in retaining the receiver to the rug. The connector preferably has a portion located below a lower surface of the rug when connected. The accessory may also provide sides when extend along edges of the rug, and in some cases even down to below the bottom surface of the rug. Corners may be provided for some embodiments. Still other embodiments have cutouts in the accessory to allow portions of the upper surface of the rug to be viewed therethrough.

15 Claims, 1 Drawing Sheet

RUG ACCESSORIES

CLAIM OF PRIORITY

This application claims the benefit of U.S. Provisional Patent Application No. 61/611,248 filed Mar. 15, 2012, incorporated by reference in its entirety.

FIELD OF THE INVENTION

The present invention relates to at least one of a series of products utilized to assist in weighting rugs such as to maintain their position on the floor, and/or to protect portions of rugs such as corners and/or edges which are particularly often prone to be the first areas to fail by becoming undone and/or provide decorative enhancements.

BACKGROUND OF THE INVENTION

Although rugs are often utilized to decorate areas to assist with interior and exterior design, the applicant is unaware of any attempt to decorate a rug with embellishments after obtaining a rug.

Furthermore, although some companies bind the edges of rugs, a process in which tape is normally provided over the rug edge which is then stitched and bound to provide an attractive appearance and prevent unraveling of the rug at the edges, the applicant is unaware of any attempt to provide a more permanent and/or protective corner or edge protection for rugs.

The applicant is also unaware of any attempt to provide embellishments or decorations internal to the edges of rugs such as are visible from above.

SUMMARY OF THE INVENTION

It is an object of many embodiments of the present invention to provide an improved rug weighting, protection and/or decorative element which is visible from above and for at least some embodiments preferably retained in position with assistance from a connection portion located below the bottom surface of the rug to prevent undesired removal.

Other embodiments provide a decorative article which may protect either corners and/or edges of rugs.

Some embodiments of the present invention may provide an ability to connect a hard decorative item such as a medallion or other decorative element above the surface of the rug and then be retained by at least one, if not a plurality of, extensions extending through the rug and retained on the back side to prevent undesired removal.

Many of the preferred embodiments are made of metal or other heavy materials and therefore assist in weighting the rug in the desired location.

Other embodiments of the present invention may provide these and/or other desirable features.

Accordingly, in accordance with a presently preferred embodiment of the present invention, one or more rug accessories can be provided either with a rug at a point of sale of the rug or can be obtained separately for use with one or more rugs. Rug accessories of the presently preferred embodiments can provide corners which provide not only a decorative surface above a rug, but also potentially extend downwardly along the side and preferably retained to the corner by a mechanical retention system such as by post(s) extending through bores in the rug which could be retained by clips, screwed on retention mechanisms, or other mechanisms such as tapes, Velcro® type attachments, alligator jaws, etc.

Other rug accessory embodiments may include edge protectors which can operate similarly or dissimilarly as corner pieces. Furthermore, interior rug accessories such as medallions, designs or decorative items may be provided in a similar or dissimilar manner.

The rug accessories could be made of metal and/or various other materials such as derivative plastics including but not limited to polyester, polystyrene, polypropylene or nylon. Even woods or various precious metals or non-precious metals could be utilized. Other materials known in the art could also be utilized.

Various shapes and sizes as desirable to those of ordinary skill in the art could be used. Furthermore, it may be that other interior designers would want the ability to change the rug accessories such as to account for various seasons or holidays which would be themed. Corporate information or other information could also be provided related to a particular team, company or other desirable feature. Seasonal accessories could be related to holidays, special dates such as birthdays or anniversaries, or other important dates, etc. This way, users could have a plurality of decorative accessories to use with a continuous singular as desired by the user.

BRIEF DESCRIPTION OF THE DRAWINGS

The particular features and advantages of the invention as well as other objects will become apparent from the following description taken in connection with the accompanying drawings in which.

DETAILED DESCRIPTION OF THE PREFERRED EMBODIMENTS

Figure 1:
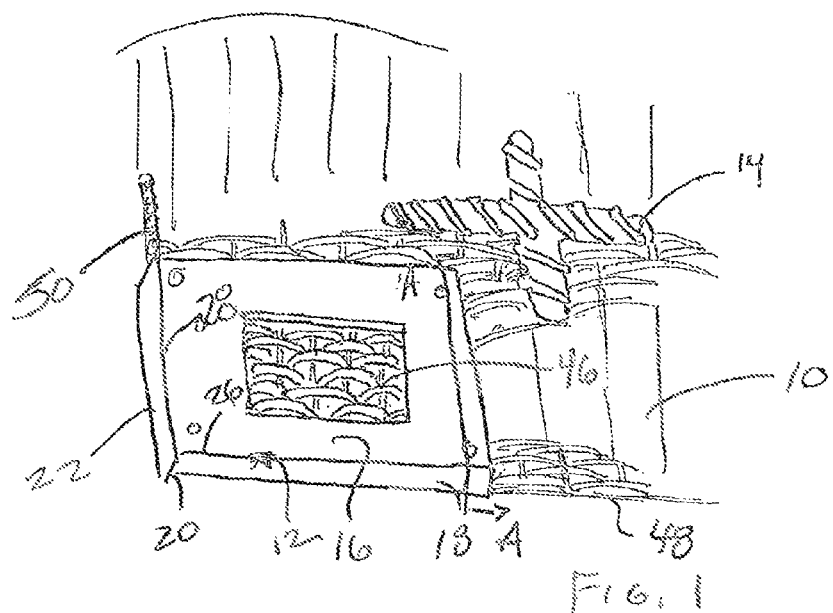
FIG. 1 shows a top perspective view of the drawing of the presently preferred embodiment of the present invention shown as connected to a rug.
Figure 2:
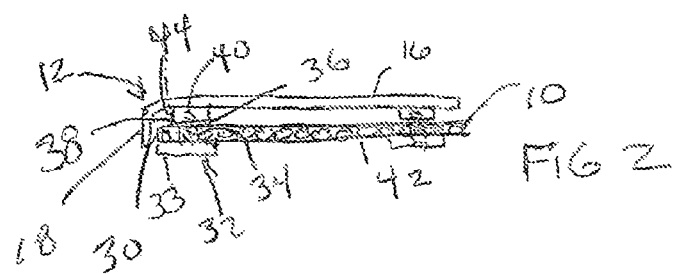
FIG. 2 shows a cross-sectional view taken along the line A-A of FIG. 1.
Figure 3:
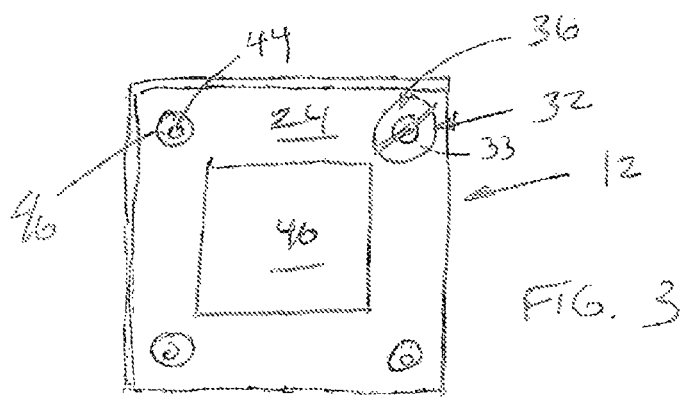
FIG. 3 shows a bottom view of the accessory of FIGS. 1 and 2.

FIG. 1 shows a perspective view of a portion of a rug 10 with first and second rug accessories 12,14 connected thereto. FIG. 2 shows a cross-sectional view showing rug accessory 12 connected to rug 10. The accessory 12 is in the form of a corner piece which has an upper surface 16, first side surface 18 and corner 20 where first side surface 12 meets second side surface 22. The first and second side surfaces 18,22 meet at corner 20 which also together meet at a single point with upper surface 16. The sides 18,22 preferably downwardly depend possibly as illustrated from upper surface 16 and meet possibly at right angles such as illustrated and preferably extend downwardly along the edge 30 and past the edge 30 of rug 10 so as to protect the edge 30 from at least some wear.

The first accessory 12 is preferably connected to the carpet 10 such as by having connectors 32 preferably extend through bores 34 created in the rug 10 which might be made by moving portions of the rug out of the way during installation of the rug accessory 12 and once the rug accessory 12 is removed, it may be possible to massage the rug 10 so that these openings or bores 34 may no longer be visible. Connectors 32 may also be "poked" through the rug 10 for some rug constructions. Some bores 34 may be difficult to conceal after removing the accessory 12. As illustrated in FIG. 2, the connector 32 is a screw having a head 33 and shaft 36. The shaft 36 is preferably received at least partially within receiver 38 after passing through bore 34.

As shown in FIG. 2, the sides such as side 18 may extend down and below a lower surface 42 of the rug 10 when installed for at least some embodiments. Various thicknesses from upper surface 16 to lower surface 24 could be provided. Receivers 38 may be connected as a portion of posts 44 or may otherwise be provided in various embodiments such as by having a thicker member therein having the upper surface 16 on a portion thereof with the receiver 38 therein. A cutout 46 is provided for decorative purposes. Other shapes and design elements may be incorporated in other embodiments.

The accessory 12 is a corner piece but it could possibly be provided as an embodiment protecting any first edge 48 or the second edge 50 of rug 10. Frames and/or frame portions could also be provided with these and/or other accessories. Other embodiments may be an edge protector along a portion if not the length of the edge 48,50 on a particular rug, second rug but not extend over a second edge. Other embodiments may protect corners such as that illustrated.

In other embodiments, accessory 14 may be provided interior to the edges 48, 50 of the rug 10 such as toward the side of the rug or other appropriate location. A simple design is illustrated, however, various medallion, logos and many other designs may be incorporated into the rug accessories 14 as would be understood by those of ordinary skill in the art.

The corner has a cutout 46 in the form of a square, but other shapes of rug accessories 12 and/or cutouts 46 could also be provided and may not necessarily be square. Although a square is illustrated, but could be various shapes having curves, angles and/or other aspects. Accessories 12 could be round, they could be oval, they could be triangular, they could be angular, etc. From an interior decorative position, cutout 46 could not only the square, but could take on the shape of stars, trees at Christmas time, fleur-de-lis, writings, like names, phrases, etc. and/or other shapes or designs such as shapes consistent with a particular holiday such as Halloween, Easter or seasonally based, etc.

Similarly, second rug accessories 14 could be provided in various shapes 14 which could be cameos, decorations, logos, emblems, team mascots, medallions, etc. or other appropriate designs such as holiday items, etc. The accessories 14 could be made at least partially of metal, plastic, such as, but not limited to, polyesters, polystyrenes, latexes, polypropylenes, nylons, polyvinylchlorides (PVC's) or rubbers. They could also be partially made of wood of various types, metals, either precious or non-precious metals and various types of blends or combinations. Accessories 14 could be hard or even pliable for some embodiments.

In addition to the decorative aspects, the accessories 12,14 also may provide weighting aspects to assist in maintaining a rug 10 in a desired position. If utilized along the first and second edges 48,50. Some rug accessories may also provide edge protection for at least some embodiments.

Although screws 32 through bores 34 are illustrated as preferred method for connection, rug accessories 12,14 may be connected with tapes, hook and loop fasteners such as to the upper surface of the rug 10, and/or with teeth, such as gator teeth, pins, clips and other attachment mechanisms as would be understood by those of ordinary skill in the art such as on, in, through or to rug 10. The rug accessories 12,14 may be utilized with indoor or outdoor rugs, commercial and/or residential rugs or various other rugs as would be understood by those of ordinary skill in the art.

Rug accessories 12,14 with various internal or external shapes could take on many decorative aspects. They could be any thickness, style, design and could be contemplated by various designers of ordinary skill in the art.

Multiple accessories 12,14 could be utilized together and/or combination to form an overall design.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. A rug accessory in combination with a rug, comprising:
   a rug;
   at least one rug accessory connected to the rug and having an upper exposed surface;
   at least one connector downwardly depending relative to the upper surface;
   each connector being removably received by a receiver secured to a lower surface of the rug accessory, wherein at least a lower portion of the connector is located below a lower surface of the rug and a surface of the lower portion of the connector contacts the lower surface of the rug;
   wherein the at least one rug accessory provides a frame defining a cutout internal to the frame at the upper exposed surface whereby an upper surface of the rug is visible through the cutout.

2. The combination of claim 1 wherein the receiver extends below an upper surface of the rug.

3. The combination of claimed 2 wherein the connector screws into the receiver.

4. The combination of claim 3 wherein the connector has a head which extends radially beyond a perimeter of the receiver.

5. The combination of claim 1 wherein the accessory is construction of at least one of metal and plastic.

6. The combination of claim 1 wherein said at least one rug accessory comprises at least two rug accessories, and the at least two rug accessories coordinate to define a design.

7. A rug accessory in combination with a rug, comprising:
   a rug;
   at least one rug accessory connected to the rug and having an upper exposed surface;
   at least one connector downwardly depending relative to the upper surface;
   each connector being removably received by a receiver secured to a lower surface of the rug accessory, wherein at least a lower portion of the connector is located below a lower surface of the rug and a surface of lower portion of the connector contacts the lower surface of the rug;
   wherein the least one rug accessory further comprises a downwardly depending first side connected to the upper surface extending alongside a first side edge of the rug, said first side terminating beyond the thickness of the first side edge of the rug.

8. The combination of claim 7 wherein the at least one rug accessory is at least two rug accessories.

9. The combination of claim 7 wherein the at least one rug accessory further comprises a downwardly depending second side connected to the upper surface extending alongside a second side edge of the rug, said second side terminating beyond the thickness second side edge of the rug.

10. The combination of claim 9 wherein the first and second sides connect at a corner.

11. The combination of claim 10 wherein the first and second sides meet at a point at the upper surface.

12. A rug accessory in combination with a rug, comprising:
a rug;
at least one rug accessory connected to the rug and having an upper exposed surface;
at least one connector downwardly directed relative to the upper surface;
at least one receiver secured to a lower surface of the rug accessory and removably connected to the respective connector to thereby assist in securely connecting the accessory to the rug through a surface of the connector contacting a lower surface of the rug;
   wherein the at least one rug accessory provides a frame defining a cutout internal to the frame at the upper exposed surface whereby an upper surface of the rug is visible through the cutout.

13. The combination claim 12 wherein the at least one rug accessory further comprises a downwardly depending first side connected to the upper surface and extending alongside a first side edge of the rug.

14. The combination of claim 13 wherein the first side extends below a bottom surface of the rug.

15. The combination of claim 12 wherein at least a portion of each connector is located below a lower surface of the rug.

\* \* \* \* \*